United States Patent [19]

Broszat et al.

[11] Patent Number: 4,953,894
[45] Date of Patent: Sep. 4, 1990

[54] ADJUSTABLE FASTENING OF A BALL JOINT TO A TRACK ROD FOR STEERING RODS OF MOTOR VEHICLES

[75] Inventors: Lothar Broszat, Monhein; Michael Servos; Dieter Schnitzler, both of Hilden, all of Fed. Rep. of Germany

[73] Assignee: TRW Ehrenreich GmbH & Co. KG, Fed. Rep. of Germany

[21] Appl. No.: 268,502

[22] Filed: Nov. 8, 1988

[30] Foreign Application Priority Data

Nov. 24, 1987 [DE] Fed. Rep. of Germany ....... 3739704

[51] Int. Cl.$^5$ .............................................. B62D 7/20
[52] U.S. Cl. ................................. 280/846; 280/673; 280/674; 280/661; 403/97; 74/522; 74/586; 74/594
[58] Field of Search ............... 280/661, 673, 674, 95.1, 280/846; 403/92, 97, 77; 74/487, 522, 586, 594, 525

[56] References Cited

U.S. PATENT DOCUMENTS

| 3,273,909 | 9/1966 | Muller et al. | 280/661 |
| 3,938,822 | 2/1976 | Guerriero | 280/95.1 |
| 4,059,361 | 11/1977 | Allison | 403/77 |
| 4,146,340 | 3/1979 | Smith, Jr. | 403/27 |
| 4,714,262 | 12/1987 | Wood | 280/95.1 |

FOREIGN PATENT DOCUMENTS

| 0222502 | 5/1987 | European Pat. Off. . |
| 931929 | 8/1955 | Fed. Rep. of Germany . |
| 2042512 | 3/1972 | Fed. Rep. of Germany ..... 280/95.1 |
| 2130898 | 3/1972 | Fed. Rep. of Germany . |
| 3028868 | 2/1982 | Fed. Rep. of Germany ........ 74/586 |
| 505020 | 12/1954 | Italy . |
| 308899 | 7/1971 | U.S.S.R. .............................. 280/95.1 |

Primary Examiner—Charles A. Marmor
Assistant Examiner—Tamara L. Finlay
Attorney, Agent, or Firm—Tarolli, Sundheim & Covell

[57] ABSTRACT

An adjustable fastening of a ball joint to a track rod (1) for steering rods of motor vehicles, in which the ball joint has a ball stud (12) supported movable in all directions around a central axis (17) in a joint housing (16), and the central axis (17) can be pushed along by adjusting the ball joint (2) in relation to the track rod (1), is said, in particular, to be possible to use even with U-shaped profiled track rods. For this purpose, the ball joint (2) has a fastening plate (16) which has a bearing bore (18) arranged eccentric to the axis (17) of movement of the ball stud (12). The fastening plate (16) is supported swingable by its bearing bore (18) on a fastening element (22), and the track rod (1) has fixing elements (23) gripping against the fastening plate (16) for fixing the ball joint (2) in a definite swinging position.

13 Claims, 3 Drawing Sheets

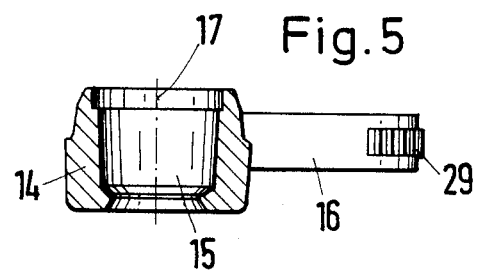
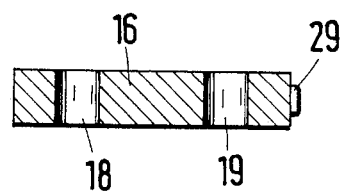
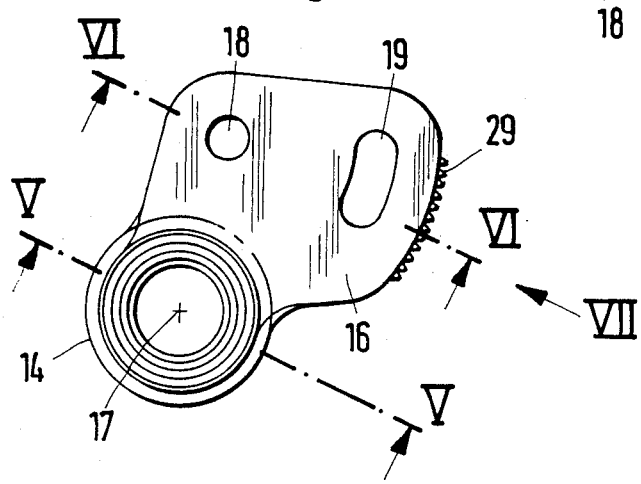
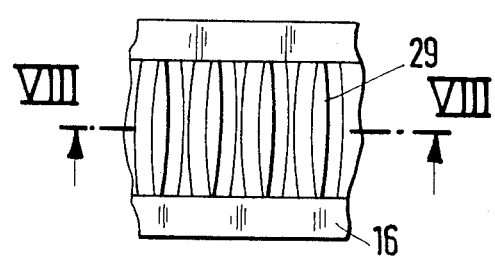
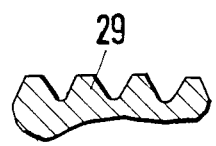

ADJUSTABLE FASTENING OF A BALL JOINT TO A TRACK ROD FOR STEERING RODS OF MOTOR VEHICLES

TECHNICAL FIELD

The subject of the invention is an adjustable fastening of a ball joint to a track rod for steering rods of motor vehicles. The ball joint has a ball stud supported movable in all directions around a central axis in a joint housing. The central axis can be pushed along by adjusting the ball joint in relation to the track rod.

BACKGROUND ART

Adjustable fastenings of ball joints to track rods are already known in which the joint housings of the ball joints are provided with a threaded stud which is screwed into the ends, slotted lengthwise, of a track rod pipe, and fixed by clamping shells. But this adjusting method cannot be applied directly to track rods with a U-profile. Moreover, a precise setting is only possible if both ends of the track rod are provided with two inner threadings, running opposite each other, to receive two ball studs. Finally, the mounting and adjustment of the previously known fastenings are relatively expensive.

From German Disclosure No. 21 30 898 is known a steering rod in which the linking points of track rods to a connection rod are adjustable. For this, ball joints are provided which, by bolt sections, grip through lengthwise holes of a central rod, and are clamped by means of clamping screws. But this construction is not especially easy to use. In particular, high initial forces are necessary in order to secure the clamping screws sufficiently.

SUMMARY OF THE INVENTION

Starting from this, the invention attacks the problem by providing an improved adjustable fastening of a ball joint to a track rod. In particular, the invention can also be used with track rods of a U-profile, is easy to mount and use, and makes possible a precise setting.

For the technical solution of this problem, it is provided that the ball joint has a fastening plate which has a bearing bore arranged eccentric to the axis of the movements of the ball stud, that the fastening plate is supported, by its bearing bore, swingable on a fastening element with the track rod, and that the track rod has fastening elements, gripping against the fastening plate, for the fixing of the ball joint in a definite swinging position.

In an adjustable fastening according to the invention, therefore, the ball joint can swing around a fastening element of the track rod, guided by the bearing bore of its fastening plate, and can be fixed in any swinging position by means of a fastening element gripping against the fastening plate. Simple screw, bolt or rivet connections, for example, may be considered as fastening elements In a simple case, a screw screwed into a track rod side threading and processing against the fastening plate may be used as a fixing element.

An adjustable fastening according to the invention has the advantage in that it can be used with track rods of U-form profile It is also easy to mount and operate because in a setting or resetting of the fastening, only the fixing elements need be used. Finally, a precise setting is also possible, especially when the track rod is connected with only one ball joint.

In one embodiment of the invention it is provided that the fastening element for the fixing of the ball joint into a definite swing position is a screw joint guided through a bore of the track rod. The fastening element grips through a lengthwise hole of the fastening plate while this lengthwise hole extends in an arc around the bearing bore. With this form of execution, the swinging range of the ball joint is determined by the length and position of the lengthwise hole. On reaching the desired swung position, the ball joint is secured by tightening the screw device. Since the screw device grips against the fastening plate at a certain distance from the bearing bore, high securing forces can be attained with slight initial forcing of the screw device.

In another embodiment, it is provided that the track rod has a bearing plate to receive the fastening element and the fixing element Such a bearing plate may consist, for example, of one leg of a U-profiled track rod. The fastening plate may rest on the bearing plate over a large area so that a favorable introduction of force and high fastening or fixing forces are attained.

In another embodiment, it is provided that the track rod has a forked head which receives in a fork opening the fastening plate of the ball joint. Here, the fastening and fixing elements consist of screws joining the legs of the forked head together. The fastening plate is clamped into the desired swung position between the legs of the forked head while both the fixing and the fastening screws are tightened. The securing attained in this way does not loosen even under rugged operating conditions.

In another embodiment, the forked head consists of the side walls of a track rod of U-profile cross-section freed at the end portion of a connection stay. Such a fastening is especially favorable in production and in strength.

In another embodiment, as fastening or fixing devices, screw devices are provided The screws are guided or screwed into insets of plastic or metal. The insets are set into openings of the track rod, and have rim flanges for their fixing in the openings. The insets make possible a good introduction of force into the track rods usually made of cast metal.

In another embodiment, the fastening plate of the ball joint is arranged perpendicular to the axis of movement of the ball stud so that the axis can be moved along in parallel.

In another embodiment, the fastening plate has side teeth which run in an arc around the bearing bore, and meshes with a worm gear of a tool which can be set rotatable against a counter-bearing on the side of the track rod. The tool and teeth form a simple worm gear, by which a precise setting of the track is possible with only a slight expenditure of force.

In another embodiment, the tool can be set, by a ring groove on the worm shaft, against the connection stay of the track rod of U-profiled cross-section, and can be applied, by means of the worm, tangent to the teeth of the fastening plate. With this embodiment, the closing edges of the connection stay adjoining the forked head are used as counter-bearing for the tool for the setting of the track.

BRIEF DESCRIPTION OF THE DRAWINGS

Other details and advantages will appear from the description which follows of the respective drawings which show preferred forms of the execution of a fastening adjustable according to the invention:

FIG. 4 shows the ball joint of the adjustable fastening in top view and on a larger scale;

FIG. 5 shows the same ball joint, along the line V—V of FIG. 4, in section;

FIG. 6 shows the same ball joint, in section along the line VI—VI of FIG. 4;

FIG. 7 is a partial view of the teeth of the ball joint in the viewing direction VII of FIG. 4 and on a larger scale;

FIG. 8 shows the same teeth in section along the line VIII—VIII of FIG. 7;

DESCRIPTION OF PREFERRED EMBODIMENTS

Figure 1:
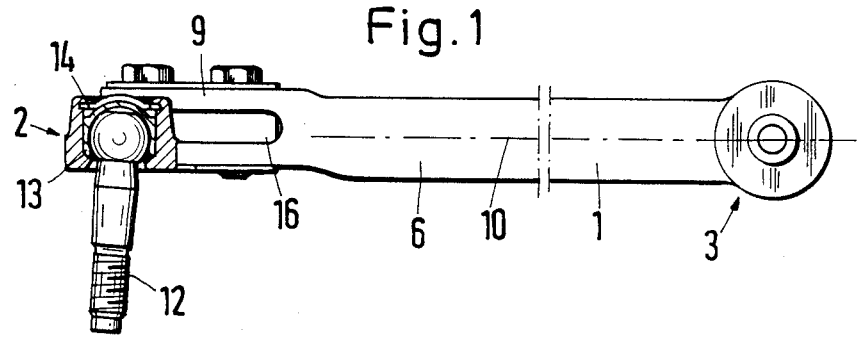
FIG. 1 shows an adjustable fastening of a ball joint, in section along the line I—I of FIG. 2.
Figure 2:
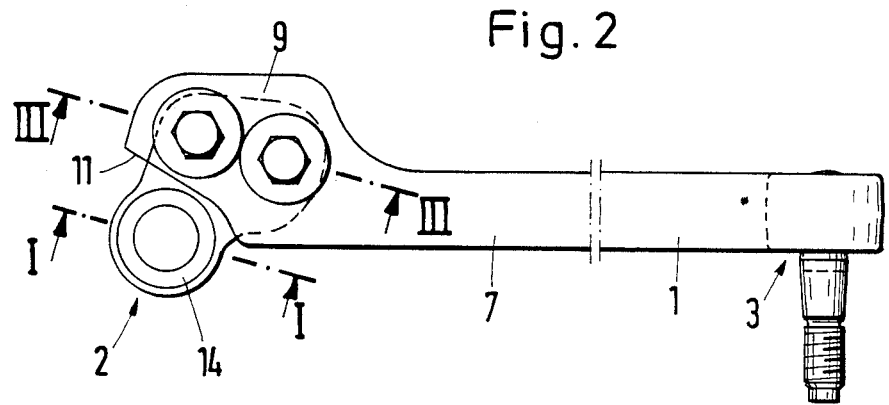
FIG. 2 shows the same adjustable fastening in top view and partly in section.

In FIGS. 1 and 2 is shown a track rod 1 which has at one end an adjustably fastened ball joint 2, and at the other end an unadjustably fastened ball joint 3. The track rod 1 is substantially U-shaped in profile, in cross-section. A connection stay 6, between the side walls 7, 8, ends before the end of the track rod 1 so that a forked head 9 is formed there. For the fastening of the ball joint 2, the side walls 7, 8 are raised in the zone of the forked head. The forked head 9 also has a cutting edge 11 running diagonal to the axis 10 of the track rod, which makes possible a swinging movement of the ball joint 2.

The ball joint 2 has a ball stud 12 which is held, with interposition of a bearing shell 13, in a joint housing 14.

Details of the joint housing 14 can be described better from FIGS. 4 to 6. The joint housing 14 has a pot-form receiver 15 for bearing shell 13 and ball stud 12, against which is flanged at the side a fastening plate 16. The fastening plate 16 is arranged perpendicular to the axis 17 of movement of the ball stud 12.

The fastening plate 16 has a bearing bore 18 which is arranged eccentric to the axis 17. The fastening plate 16 also has a lengthwise hole 19 which extends in an arc around the bearing bore 18.

Figure 3:
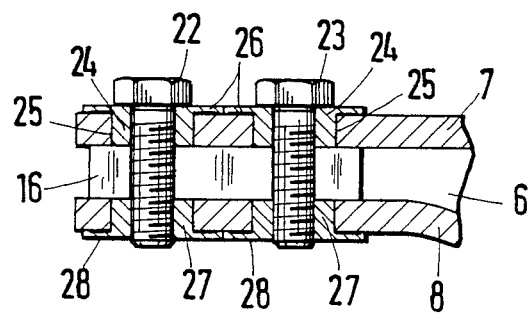
FIG. 3 shows the same adjustable fastening, in partial section along the line III—III of FIG. 2, on a larger scale.

As can be seen from FIGS. 1 to 3, the fastening plate 16 is inserted between the side walls 7, 8 of the forked head 9, and is fastened and fixed there by means of screws 22, 23. The screws 22, 23 are guided, at the head end, into insets 24 of plastic or metal which are set into openings 25 of the forked head 9, and are held there axially by fastening flanges 26. At the threaded end, the screws 22, 23 are screwed into insets 27 which also have fastening flanges 28. These insets 27 serve, in particular, for the uniform introduction of forces into the track rod 1.

By tightening the screws 22, 23, the side walls 7, 8 of the track rod 1 are drawn together in the zone of the forked head 9, while the fastening plate 16, and thus the ball joint 2, is fixed in the desired swung position. A resetting of the connection is possible simply by loosening the screws 22, 23, swinging the fastening plate 16 around the screw 22, and then tightening the two screws 22, 23.

To facilitate the setting and resetting of the fastening, the fastening plate 16 has on its rim a set of teeth 29 represented in FIGS. 4 to 9. As can be seen especially well from FIG. 4, the set of teeth 29 is arranged in an arc around the bearing bore 18 so that as a component of a worm gear, they can set in rotation the fastening plate 16 around the bearing bore 18.

Figure 9:
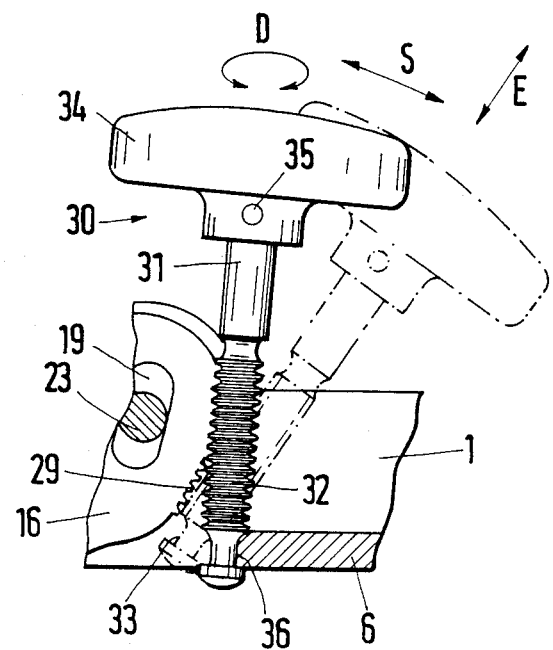
FIG. 9 shows the adjustable fastening in partial section and with tool set in (in broken line) for the setting of the track, and with setting of the track (in solid lines).

For this purpose, a tool 30 as another component is provided as shown in FIG. 9. The tool 30 has a shaft 31, on the middle section of which a worm 32 is formed. At the end, the shaft 31 has a ring groove 33 with circular cross-section. At the other end, the tool 30 is equipped with a handle 34 fastened by means of a splint 35 to the shaft 31.

For the setting of the track, the tool 30 is pushed, in the introduction direction E, between the fastening plate 16 and the connection stay 6 of the track rod 1 so that the ring groove 33 is arranged at about the height of the connection stay 6. With this, the worm 32 can already mesh, in its lower zone, with the teeth 29. Then the tool 30, by swinging in the rotation direction S, is brought to contact, by its ring groove 33, against a corresponding radius 36 of the connection stay 6. With this, the worm 32 comes into engagement, at its middle or upper portion, with the teeth 29. By rotating the handle 34 in the rotation direction D, the track can now be set exactly and with the saving of force.

After the setting, the tool 30 is removed by swinging it back in the swinging direction S and in the introduction direction E.

Having described preferred embodiments of the invention, the following is claimed:

1. An adjustable fastening of a ball joint (2) to a track rod (1) for steering rods of motor vehicles, the ball joint (2) having a ball stud (12) supported for movement in all directions around a central axis (17) in a joint housing, the central axis (17) being movable relative to the track rod (1) by adjusting the ball joint (2), said adjustable fastening comprising:

a fastening plate (16) associated with the ball joint (2) and having a bearing bore (18) arranged eccentric to the central axis (17) of the ball stud (12);

fastening means (22) for supporting said fastening plate (16) at the bearing bore (18) for swinging movement of said fastening plate (16) between a number of swing positions;

fixing means (23) for gripping said fastening plate (16) to fix the ball joint (2) in a certain swing position; and wherein the track rod (10) has a forked head (9) which receives between a side wall (7) and another side wall (8) said fastening plate (16) of the ball joint (2).

2. The adjustable fastening according to claim 1 wherein said fixing means includes a screw device which is guided through a bore of the track rod (1) and which extends through a lengthwise hole (19) of said fastening plate (16), the lengthwise hole (19) extending in an arc around the bearing bore (18).

3. The adjustable fastening according to claim 1 wherein the track rod (1) has a bearing plate (6, 7) to receive said fastening means (22) and said fixing means (23).

4. The adjustable fastening according to claim 1 wherein said forked head (9) is formed of said side wall (7, 8) of the track rod (1), freed at an end portion from a connection stay (6), with a substantially U-shaped cross-section.

5. The adjustable fastening according to claim 4 wherein said fastening plate (16) has a side set of teeth

(29) which extends in an arc around the bearing bore (18) and which meshes with a worm (32) of a tool (30) which can be set rotatable against a counter-bearing on a side of the track rod (1).

6. The adjustable fastening according to claim 5 wherein said tool (30) can be set, by a ring groove (33) on the worm shaft (31), against said connection stay (6) of the track rod (1) with U-shaped cross-section, and can be applied, by means of said worm (32), tangent to said teeth (29) of said fastening plate (16).

7. The adjustable fastening according to claim 1 wherein said fastening means (22) and said fixing means (23) are guided into insets (24, 27) set into openings (25) of the track rod (1), said insets (24, 27) having fastening flange means (26, 28) for their fixing in the openings (25).

8. The adjustable fastening according to claim 1 wherein said fastening plate (16) of the ball joint (2) is arranged perpendicular to the central axis (17) of the ball stud (12).

9. An adjustable fastening of a ball joint (2) to a track rod (1) for steering rods of motor vehicles, the ball joint (2) having a ball stud (12) supported for movement in all directions around a central axis (17) in a joint housing, the central axis (17) being movable relative to the track rod (1) by adjusting the ball joint (2), said adjustable fastening comprising:
a fastening plate (16) associated with the ball joint (2) and having a bearing bore (18) arranged eccentric to the central axis (17) of the ball stud (12);
fastening means (22) for supporting said fastening plate (16) at the bearing bore (18) for swinging movement of said fastening plate (16) between a number of swing positions; and
fixing means (23) for gripping said fastening plate (16) to fix the ball joint (2) in a certain swing position, including a screw device which is guided through a bore of the track rod (1) and which extends through a lengthwise hole (19) of said fastening plate (16), the lengthwise hole (19) extending in an arc around the bearing bore (18) and wherein the track rod (1) has a bearing plate (6, 7) to receive said fastening means (22) and said fixing means (23) and a forked head (9) which receives between a side wall (7) and another side wall (8) said fastening plate (16) of the ball joint (2).

10. The adjustable fastening according to claim 9 wherein said forked head (9) is formed of said side walls (7, 8) of the track rod (1), freed at an end portion from a connection stay (6), with a substantially U-shaped cross-section.

11. The adjustable fastening according to claim 9 wherein said fastening means (22) and said fixing means (23) are guided into insets (24, 27) set into openings (25) of the track rod (1), said insets (24, 27) having fastening flange means (26, 28) for their fixing in the openings (25).

12. The adjustable fastening according to claim 9 wherein said fastening plate (16) of the ball joint (2) is arranged perpendicular to the central axis (17) of the ball stud (12) and wherein said fastening plate (16) has a side set of teeth (29) which extends in an arc around the bearing bore (18) and which meshes with a worm (32) of a tool (30) which can be set rotatable against a counter-bearing on a side of the track rod (1).

13. The adjustable fastening according to claim 12 wherein said tool (30) can be set, by a ring groove (33) on the worm shaft (31), against said connection stay (6) of the track rod (1) with U-shaped cross-section, and can be applied, by means of said worm (32), tangent to said teeth (29) of said fastening plate (16).

* * * * *